United States Patent
Hasegawa et al.

(10) Patent No.: US 8,224,626 B2
(45) Date of Patent: Jul. 17, 2012

(54) QUALITY DEGRADATION POINT ESTIMATING SYSTEM AND QUALITY DEGRADATION POINT ESTIMATING METHOD

(75) Inventors: Yohei Hasegawa, Tokyo (JP); Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1009 days.

(21) Appl. No.: 11/993,155

(22) PCT Filed: Jun. 20, 2006

(86) PCT No.: PCT/JP2006/312276
§ 371 (c)(1),
(2), (4) Date: Dec. 19, 2007

(87) PCT Pub. No.: WO2006/137373
PCT Pub. Date: Dec. 28, 2006

(65) Prior Publication Data
US 2010/0049460 A1    Feb. 25, 2010

(30) Foreign Application Priority Data
Jun. 24, 2005   (JP) .............................. 2005-184342

(51) Int. Cl.
*G06F 11/30*   (2006.01)
*G21C 17/00*   (2006.01)

(52) U.S. Cl. ..................................................... 702/185

(58) Field of Classification Search .................... 702/185
See application file for complete search history.

(56) References Cited

U.S. PATENT DOCUMENTS

| | | | | |
|---|---|---|---|---|
| 5,815,668 | A | * | 9/1998 | Hashimoto .................. 709/238 |
| 6,614,763 | B1 | * | 9/2003 | Kikuchi et al. ............... 370/252 |
| 2002/0129295 | A1 | * | 9/2002 | Nishioka et al. ................ 714/4 |
| 2006/0190620 | A1 | * | 8/2006 | Kobayashi .................... 709/242 |
| 2007/0211645 | A1 | | 9/2007 | Tachibana et al. |
| 2010/0177646 | A1 | * | 7/2010 | Kobayashi .................... 370/252 |

FOREIGN PATENT DOCUMENTS

| | | |
|---|---|---|
| JP | 2000224172 A | 8/2000 |
| JP | 2002064493 A | 2/2002 |
| JP | 2002064545 A | 2/2002 |
| JP | 2002271267 A | 9/2002 |

(Continued)

OTHER PUBLICATIONS

Kobayashi et al., Scalable Qos Degradation Locating, System Platforms Research Laboratories, NEC Corporation, The Institute of Electronic Information and Communication Engineers, IEICE Technical Report NS2005-89, IN2005-77, CS2005-35(Sep. 2005).

(Continued)

*Primary Examiner* — Michael Nghiem

(57) ABSTRACT

A quality degradation point estimating method for estimating a quality degradation point in a directed link set through which a communication flow passed is provided. The quality degradation point estimating method has: (A) determining a test flow set for estimating a quality degradation point; and (B) estimating the quality degradation point in the directed link set by sending the test flow set to the network. The (A) step includes a step of setting the flow, which passes through a partial set as a part of the directed link set, as the test flow and adding the set test flow to the test flow set. The test flow is sent from the test terminal on the network to a predetermined node in the partial set. A response is obtained at the predetermined node, and the response is sent from the predetermined node to a predetermined terminal.

7 Claims, 13 Drawing Sheets

FOREIGN PATENT DOCUMENTS

| | | |
|---|---|---|
| JP | 2002271392 A | 9/2002 |
| JP | 2003258903 A | 9/2003 |
| JP | 2005210515 A | 8/2005 |
| JP | 2006033715 A | 2/2006 |
| JP | 2006080584 A | 3/2006 |

OTHER PUBLICATIONS

PCT/JP2006/312276 International Search Report, mailed Jul. 14, 2006.

Hajime Sugimura et al., "VoIP ni Okeru QoS Kanri Gijutsu no Kento", The 2001 Institute of Electronics, Information and Communication Engineers Sogo Taikai Koen ronbunshu Communications 2-B-6-117, Mar. 7, 2001, p. 125, full text, all drawings (Packet Monitoring and Testing Methods for VoIP Networks).

Japanese Office Action for JP2007-522279 mailed Dec. 2, 2010.

M. Kobayashi et al., "Estimating points of QoS degradation in the network from the aggregation of per-flow quality information", Technical Report of IEICE, The Institute of Electronics, Information and Communication Engineers, vol. 104, No. 707, Mar. 2005, pp. 31-36.

A. Tachibana et al., "Locating Congested Segments over the Internet Based on Multiple End-to-End Path Measurements", IEICE Trans. Commun., vol. E89-B, No. 4, Apr. 2006, pp. 1099-1109.

M. Tsuru et al., "Inferring link characteristics from end-to-end path measurements", IEEE, 2001m pp. 1534-1538.

* cited by examiner

Fig. 1

PRIOR ART

| FLOW \ LINK | L0 | L1 | L2 | L3 |
|---|---|---|---|---|
| TEST FLOW 1 | 1 | 0 | 0 | 0 |
| TEST FLOW 2 | 0 | 1 | 0 | 0 |
| TEST FLOW 3 | 0 | 0 | 1 | 0 |
| TEST FLOW 4 | 0 | 0 | 0 | 1 |

Fig. 3A

| FLOW \ LINK | L0 | L1 | L2 | L3 | L(N) | L(N+1) | QUALITY |
|---|---|---|---|---|---|---|---|
| FLOW (300) | 1 | 1 | 1 | 1 | 1 | 1 | DEGRADED |
| FLOW (310) | 0 | 1 | 0 | 0 | 0 | 0 | GOOD |
| FLOW (320) | 0 | 0 | 0 | 0 | 0 | 1 | GOOD |

Fig. 3B

| FLOW \ LINK | L0 | L1 | L2 | L3 | L(N) | L(N+1) | QUALITY |
|---|---|---|---|---|---|---|---|
| FLOW (300) | 1 | ~~1~~ | 1 | 1 | 1 | ~~1~~ | DEGRADED |
| FLOW (310) | 0 | ~~1~~ | 0 | 0 | 0 | ~~0~~ | GOOD |
| FLOW (320) | 0 | ~~0~~ | 0 | 0 | 0 | 1 | GOOD |

Fig. 6

| REPLAYING TERMINAL / LINK | L2 | L3 | L(N) |
|---|---|---|---|
| TERMINAL (200-3) | 1 | 1 | 1 |
| TERMINAL (200-4) | 0 | 0 | 1 |

Fig. 10A

| FLOW \ LINK | L0 | L1 | L2 | L3 | L(N) | L(N+1) | QUALITY |
|---|---|---|---|---|---|---|---|
| FLOW (300) | 1 | 1 | 1 | 1 | 1 | 1 | DEGRADED |
| FLOW (310) | 0 | 1 | 0 | 0 | 0 | 0 | GOOD |
| FLOW (320) | 0 | 0 | 0 | 0 | 0 | 1 | GOOD |
| FLOW (500) | 0 | 0 | 1 | 1 | 1 | 0 | |
| FLOW (510) | 0 | 0 | 1 | 1 | 0 | 0 | |
| FLOW (520) | 0 | 0 | 1 | 0 | 0 | 0 | |
| FLOW (700) | 1 | 0 | 0 | 0 | 0 | 0 | |

Fig. 10B

| FLOW \ LINK | L0 | L1 | L2 | L3 | L(N) | L(N+1) | QUALITY |
|---|---|---|---|---|---|---|---|
| FLOW (300) | 1 | 1 | 1 | 1 | 1 | 1 | DEGRADED |
| FLOW (310) | 0 | 1 | 0 | 0 | 0 | 0 | GOOD |
| FLOW (320) | 0 | 0 | 0 | 0 | 0 | 1 | GOOD |
| FLOW (500) | 0 | 0 | 1 | 1 | 1 | 0 | DEGRADED |
| FLOW (510) | 0 | 0 | 1 | 1 | 0 | 0 | DEGRADED |
| FLOW (520) | 0 | 0 | 1 | 0 | 0 | 0 | GOOD |
| FLOW (700) | 1 | 0 | 0 | 0 | 0 | 0 | GOOD |

Fig. 13A

| FLOW\LINK | L0 | L2 | L3 | L(N) |
|---|---|---|---|---|
| TEST FLOW 1 | 1 | 0 | 0 | 0 |
| TEST FLOW 2 | * | 1 | 0 | 0 |
| TEST FLOW 3 | * | * | 1 | 0 |
| TEST FLOW 4 | * | * | * | 1 |

Fig. 13B

| FLOW\LINK | L0 | L2 | L3 | L(N) |
|---|---|---|---|---|
| FLOW | 1 | 0 | 0 | 0 |
| FLOW | 0 | 1 | 0 | 0 |
| FLOW | 0 | 1 | 1 | 0 |
| FLOW | 0 | 1 | 1 | 1 |

800 — 810 — 820 — 830

QUALITY DEGRADATION POINT ESTIMATING SYSTEM AND QUALITY DEGRADATION POINT ESTIMATING METHOD

TECHNICAL FIELD

The present invention relates to a quality degradation point estimating system and a quality degradation point estimating method, which estimate a failure point and a quality drop point in a network, and a test flow determining method.

BACKGROUND ART

In accompaniment with complexity of an information system that uses a network, it has become more and more difficult to specify a failure point when a communication failure or a communication quality degradation has occurred. For the sake of a quick recovery from a quality degradation (QoS degradation), a technique that can estimate a quality degradation point (point of QoS degradation) at a high precision is desired.

Conventionally, in order to estimate a quality degradation point in the network, for example, the quality of a flow (user flow) in the network is measured. Instead, a test communication (hereinafter, to be referred to as "a test flow) is performed in the network, and the quality of the test flow is measured. Here, the flow is a flow of packets between terminals in a certain application. The quality degradation point can be estimated in accordance with the quality of a flow passing through various routes. In order to improve the estimation precision of the quality degradation point, the selection of a route for the test flow is important.

In "Estimating points of QoS degradation in the network from the aggregation of per-flow quality information" (The Institute of Electronics, Information and Communication Engineers, TM Research Group, Vol. 104, No. 707, Pp. 31-36, May 3, 2005) by Masayoshi Kobayashi, Yohei Hasegawa, and Tsutomu Murase, a method of estimating a quality degradation point is disclosed. According to this method, the quality degradation point is estimated by using both of the quality of a user flow and the quality of a test flow in a network. Specifically, a group of test flows is determined such that the test flows pass through links included in a set of links through which the user flow passes. Here, the test flow set, namely, test flow routes are determined such that the links through which the respective test flows pass are different from each other. Measuring the quality degradation in the different test flow route allows the quality of each link to be determined to be degraded.

FIG. 1 is one example of a flow/link correspondence table that indicates a relation a plurality of test flows used in an estimating method and links to which the test flows are applied. A set of links to which the user flows are applied includes links L0 to L3. The links to which respective test flows are applied are different from each other. Each test flow is configured to be applied to only a certain link and not to be applied to the other links. Since the plurality of test flows are used, the link whose quality is degraded is estimated. However, this method requires to search the test flow which passes through only a targeted link. The restriction to search the test flow is severe, and a probability at which the test flow can be discovered is low. When the test flow that passes through only one link cannot be generated, the link in which the quality degradation occurs cannot be detected. Moreover, the search for the routing is required at each node or terminal that serves as the end point of each link. Thus, the search cost becomes expensive.

As other techniques related to control of a communication route, the followings are known.

Japanese Laid Open Patent Application (JP-P2002-64493A) describes a control method of a communication route in a plurality of networks. The plurality of networks are connected to each other and managed by a network managing system. Each network has a network apparatus. According to this control method, a communication conductivity of the route from a network apparatus in a first network to a network apparatus in a second network is held.

Japanese Laid Open Patent Application (JP-P2002-271392A) describes a voice quality managing method for each call in an IP network. A telephone communication quality for each call is monitored from a remote end. A quality degradation is detected in substantially real time. Since the measurement is performed without any installation of an external measuring apparatus, a cost is suppressed. Also, delay information in end-to-end is collected.

Japanese Laid Open Patent Application (JP-P2003-258903A) discloses a communication path monitoring system. The communication path monitoring system monitors a communication path established between data processors, in the communication network composed of a plurality of data processors and propagation paths. In particular, the communication monitoring system contains an attribute value obtaining unit for obtaining an attribute value of a communication path as a monitor target. The attribute obtaining unit has first to third units. The first unit obtains control information to establish the communication path that serves as the information transferred between the data processors. The second unit extracts the setting information with regard to the obtainment of the attribute value, from the obtained control information. The third unit uses extracted setting information and obtains the attribute value from the information that passes on the established communication path.

DISCLOSURE OF INVENTION

An object of the present invention is to provide a technique that can search a link including a quality degradation point in a network at a high probability.

Another object of the present invention is to provide a technique that can efficiently set a test flow set to estimate a quality degradation point in the network.

Still another object of the present invention is to provide a technique that can reduce a cost to search a route at a node or terminal in a network, when a quality degradation point in the network is estimated.

In a first exemplary embodiment of the present invention, a quality degradation point estimating method for estimating a quality degradation point in a directed link set through which a communication flow passed is provided. The quality degradation point estimating method has: (A) determining a test flow set for estimating a quality degradation point; and (B) estimating the quality degradation point in the directed link set by sending the test flow set to the network. The (A) step includes a step of setting the flow, which passes through a partial set as a part of the directed link set, as the test flow and adding the set test flow to the test flow set. The test flow is sent from the test terminal on the network to a predetermined node in the partial set. A response is obtained at the predetermined node, and the response is sent from the predetermined node to a predetermined terminal.

The (A) step includes: (a) setting continuous directed links included in the directed link set as the partial set and then setting an interval of the continuous directed links as a directed link interval; (b) setting the flow, which passes through at least a part of the directed link interval, as the test flow; and (c) adding the set test flow to the test flow set. The test flow is sent from the test terminal to the predetermined node in the directed link interval. The response is obtained at the predetermined node, and the response is sent from the predetermined node to the predetermined terminal.

The determined test flow set may include a first test flow. The first test flow is sent from the test terminal to a termination point in the directed link interval, the response is obtained at the termination point, and the response is sent from the termination point to the predetermined terminal.

The determined test flow set may include a second test flow. The second test flow is sent from the test terminal to a start point in the directed link interval, the response is obtained at the start point, and the response is sent from the start point to the predetermined terminal.

The determined test flow set may include a plurality of third test flows. Here, the number of the hops until the intersection point at which the flows from the test terminal overlap on the directed link interval is assumed to be H1, and the number of the hops until the termination point of the directed link interval from the test terminal is assumed to be H2. At this time, each TTL (Time To Live) value in the plurality of third test flows is set to H1 or more and H2 or less, and each of destinations is set at the termination point of the directed link interval. Each of the plurality of third test flows is sent to the plurality of nodes in the directed link interval from the test terminal, the response is obtained at each of the plurality of nodes, and the response is sent from each node to the predetermined terminal.

In that case, the (b) step may include: (b1) setting the start point of the directed link interval at the predetermined node; (b2) setting the flow sent to the predetermined node as one of the plurality of third test flows; and (b3) repeatedly executing the (b2) step while changing the predetermined nodes from the start point of the directed link interval to the termination point, one hop at a time.

The (A) step further includes (d1) determining the route from the terminal, in which the flow can be generated in the directed link interval, to the termination point of the directed link interval; and (d2) setting the terminal corresponding to the route having the longest overlapping with the directed link interval, in the determined routes, as the test terminal.

The (A) step may further include (e1) setting the link set included in the directed link interval as an indefinite link set, if the test terminal is not found out; and (e2) removing the indefinite link set from the directed link set and updating the directed link set.

The response obtained in the predetermined node may be an ECHO response resulting from ICMP (Internet Control Message Protocol). Also, the response may be the response resulting from a packet survival time excess.

The predetermined terminal receiving the response may be the test terminal. The distance between the predetermined node sending the response and the predetermined terminal may be shorter than the distance between the predetermined node and the test terminal.

In a second exemplary embodiment of the present invention, the quality degradation point estimating method for estimating the quality degradation point in the directed link set through which the communication flow passed is provided. The quality degradation point estimating method has: (A) determining the test flow set to estimate the quality degradation point; and (B) sending the test flow set to the network and consequently estimating the quality degradation point in the directed link set. The (A) step includes: (f) setting one link, which is included in the partial set serving as a part of the directed link set, as a targeted link; (g) removing the one link from the partial set and consequently updating the partial set and then setting the link included in the updated partial set as a non-targeted link; (h) setting the flow, which passes through the targeted link and does not pass through the non-targeted link, as the test flow; (i) adding the set test flow to the test flow set; and (j) repeating the (f) to (i) steps until the partial set becomes an empty set.

At the (f) step, continuous directed links included in the directed link set may be set as the partial set.

In a third exemplary embodiment of the present invention, a quality degradation point estimating system for monitoring the quality degradation point in the directed link set through which the communication flow passed is provided. The quality degradation point estimating system contains: a plurality of terminals that are connected to a network and can be communicated through a router to each other; and a monitoring server that is connected to the network and monitors the quality of the communication between the plurality of terminals. The monitoring server sets the flow, which passes through the partial set serving as a part of the directed link set, as the test flow to estimate the quality degradation point. The test flow is sent from the test terminal among the plurality of terminals to the predetermined node in the partial set. Then, the response is obtained at the predetermined node, and the response is sent from the predetermined node to the predetermined terminal among the plurality of terminals. The predetermined terminal reports the quality of the test flow to the monitoring server. The monitoring server estimates the quality degradation point in accordance with the quality of the test flow.

The monitoring server may set the continuous directed links included in the directed link set, as the partial set. In this case, the monitoring server sets the interval of the continuous directed links as the directed link interval, and sets the flow, which passes through at least a part of the directed link interval, as the test flow.

According to the present invention, a link including the quality degradation point in the network can be searched at a high probability. Also, the test flow set to estimate the quality degradation point in the network can be efficiently set. Moreover, when the quality degradation point is estimated in the network, a cost to search the routing at the node or terminal in the network can be reduced.

BRIEF DESCRIPTION OF DRAWINGS

FIG. 1 shows a flow/link correspondence table that indicates a relation between a test flow and a link through which the test flow passes, in a conventional technique;

FIG. 3A is a diagram showing one example of a flow/link correspondence table according to the first exemplary embodiment;

FIG. 3B is a diagram showing one example of the updating of the flow/link correspondence table shown in FIG. 3A;

FIG. 6 is a diagram showing one example of an overlap state of routes obtained by a route overlap investing section according to the first exemplary embodiment;

FIG. 10A is a diagram showing one example of the flow/link correspondence table including a test flow set according to the first exemplary embodiment;

FIG. 10B is a diagram showing one example of the flow/link correspondence table including the test flow set according to the first exemplary embodiment;

FIG. 13A shows one example of a test flow set table according to the second exemplary embodiment; and FIG. 13B shows one example of the test flow set table according to the second exemplary embodiment.

BEST MODE FOR CARRYING OUT THE INVENTION

Hereinafter, a quality degradation point estimating system, a quality degradation point estimating method and a test flow determining method according to exemplary embodiments of the present invention will be described with reference to the attached drawings. A network quality measuring system in a packet switching network is exemplified as the quality degradation point estimating system in the exemplary embodiments.

First Exemplary Embodiment 1-1. Configuration

Figure 2:
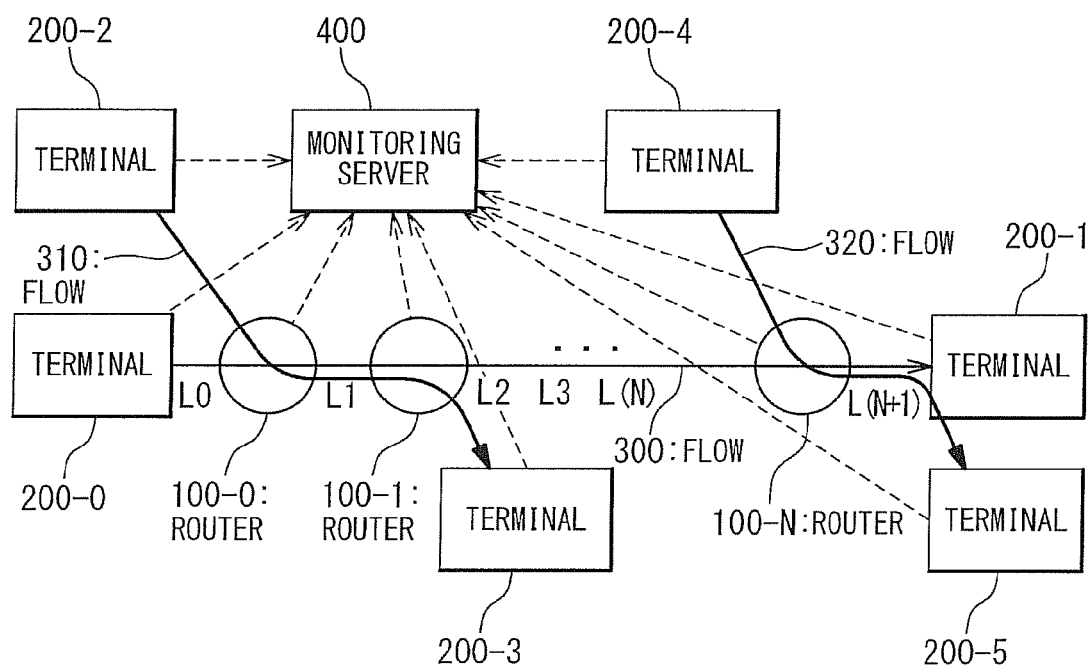
FIG. 2 is a block diagram showing a configuration of a quality degradation point estimating system according to a first exemplary embodiment of the present invention.

FIG. 2 schematically shows the configuration of the network quality measuring system (quality degradation point estimating system) according to the first exemplary embodiment. The network quality measuring system contains a plurality of routers 100 (100-0 to 100-N; N is a natural number), a plurality of terminals 200 (200-0 to 200-5) as computer apparatuses; and a monitoring server 400. The plurality of terminals 200 and the monitoring server 400 are connected to each other through a network. The plurality of routers 100 are arranged on the network and connected to each other. In short, the plurality of terminals 200, and these terminals 200 and the monitoring server 400 are connected to each other through the routers 100, and bidirectional communication can be carried out between them. It should be noted that FIG. 2 shows six terminals 200-0 to 200-5. However, the number of terminals is not limited to 6.

A physical connection between the routers 100 or the physical connection between an end router 100 and the terminal 200 is referred to as a "link". In particular, when a direction is also considered, each connection is referred to as a "directed link". The directed link is defined with an address of a start point and an address of a final point. FIG. 1 shows a plurality of directed links L0 to L(N+1). A route from the terminal 200-0 to the terminal 200-1 passes through the plurality of routers 100-0 to 100-N, and this is constituted by the plurality of links (link set) L0 to L(N+1).

A flow of packets between the terminals 200 in a certain application is referred to as a "flow". In particular, when the direction is also considered, a flow of packets is referred to as a "directed flow". For example, in FIG. 1, a communication from the terminal 200-0 to the terminal 200-1 is carried out through a directed flow 300. A communication from the terminal 200-2 to the terminal 200-3 is carried out through a directed flow 310. A communication from the terminal 200-4 to the terminal 200-5 is carried out through a directed flow 320.

With regard to these flows, a flow/link correspondence table can be defined to indicate a relation of each flow and the link through which the flow passes. FIG. 3A shows one example of the flow/link correspondence table. FIG. 3A shows the relation between the directed flows 300 to 320 on the network and the links (L0 to L(N+1)) through which the flows pass. With regard to each flow, the link through which the flow passes is represented by "1", and the link through which the flow does not pass is represented by "0". Also, the flow/link correspondence table shows the quality on the routes of the respective flows. For example, the quality of the flow 300 is degraded, and the good quality is obtained with regard to the flows 310 and 320. The degradation in the quality is indicated by, for example, a flag.

When a certain communication flow is generated between the terminals 200, the terminal 200 on a receiving side measures the quality of its communication flow. Then, the terminal 200 on the receiving side sends a "quality data" as its quality measurement result to the monitoring server 400. In FIG. 2, the quality data are transferred from the terminals 200-1, 200-3 and 200-5 to the receiving side among the terminals 200-0 to 200-5, which carry out the communications, to the monitoring server 400, respectively.

When the quality degradation in the communication flow is detected and determined, it is necessary to estimate the link in which the degradation is generated. According to this exemplary embodiment, in order to estimate the quality degradation point, a "test flow" is sent to the network. In order to improve the estimation precision of the quality degradation point, the selection of the route to which the test flow is sent. It is the monitoring server 400 that determines a route of the test flow. In this exemplary embodiment, the monitoring server 400 has a function of determining the route of the test flow in accordance with the quality data received from the terminal 200. Also, the monitoring server 400 has a function of instructing the generation of the determined test flow to the terminal 200. Moreover, the monitoring server 400 has a function of estimating a quality degradation point in accordance with the quality data of the test flow.

Figure 4:
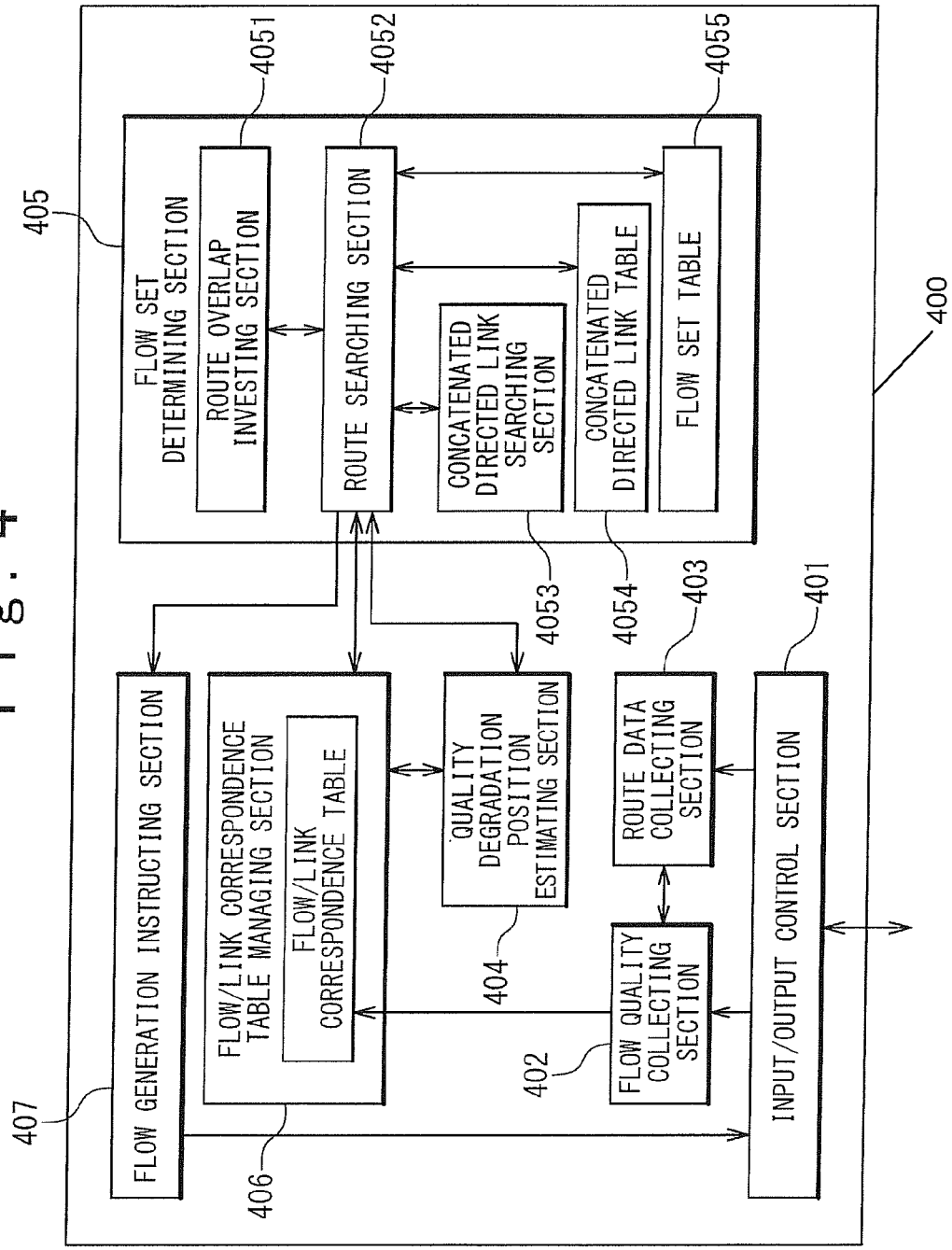
FIG. 4 is a block diagram showing a configuration of a monitoring server according to the first exemplary embodiment.

FIG. 4 schematically shows the configuration of the monitoring server 400 according to this exemplary embodiment. The monitoring server 400 contains an input output control section 401, a flow quality collecting section 402, a route data collecting section 403, a quality degradation point estimating section 404, a flow set determining section 405, a flow/link correspondence table managing section 406 and a flow generation instructing section 407.

The input output control section 401 controls the input/output of packets from/to the network. The flow quality collecting section 402 collects the quality data of the flows that are reported from the terminals 200 through the network. The route data collecting section 403 collects a route data (a routing table) from the router 100 on the network. The quality degradation point estimating section 404 integrates the quality data collected from the terminals 200 and estimates a quality degradation point in the network. The flow set determining section 405 sets a set of the test flows (hereinafter, to be referred to as a "test flow set Z") required to specify the quality degradation point. The flow/link correspondence table managing section 406 manages a flow/link correspondence table (refer to FIG. 3A). The flow generation instructing section 407 instructs the terminal 200 to generate the test flow determined by the flow set determining section 405.

As mentioned above, the flow set determining section 405 sets the test flow set Z. Here, the link set of a test target has a high possibility that the continuous directed links are included. Hereinafter, the continuous directed links are referred to as "concatenated directed links". Also, there is a case that an interval of the concatenated directed links is referred to as a "directed link interval P". A quality degradation point has a high possibility that it is included in the concatenated directed links. Thus, the flow set determining section 405 according to this exemplary embodiment especially pays attention to this concatenated directed links.

As shown in FIG. 4, the flow set determining section 405 contains a route overlap investing section 4051, a route searching section 4052, a concatenated directed link searching section 4053, a concatenated directed link table 4054 and a flow set table 4055. The concatenated directed link table 4054 is a table for indicating the concatenated directed links and is stored in a storage unit. Also, the flow set table 4055 is a table for indicating the test flow set Z used to estimate the quality degradation point and is stored in the storage unit. The concatenated directed link searching section 4053 searches the concatenated directed links (the directed link interval P) from the link set as the test target and prepares and updates the concatenated directed link table 4054 indicating the concatenated directed links. The route searching section 4052 refers to the concatenated directed link table 4054 and searches a route for a test flow to estimate the quality degradation point. Also, the route searching section 4052 prepares and updates the flow set table 4055 to indicate the test flow set Z. The route overlap investing section 4051 checks the overlap between the route of the test flow and the directed link interval P.

It should be noted that the respective sections are attained through cooperation of an operational process and a software program executed by an operational processor.

1-2. Detailed Process

A process of the network quality measuring system according to this exemplary embodiment will be described below in detail with reference to FIG. 4. It should be noted that in the following description, there is a case that a quality degradation point, namely, a link in which the quality degradation has been caused is referred to as a "degradation link".

(Generation for Flow/Link Correspondence Table)

The input output control section 401 in the monitoring server 400 receives a quality data with regard to each flow from the terminal 200 on the receiving side and transfers the received quality data to the flow quality collecting section 402. The flow quality collecting section 402 inquires of the route data collecting section 403 about a link through which each flow passes. The route data collecting section 403 collects a routing table (route data) from each router 100 through the input output control section 401. In response to the inquiry from the flow quality collecting section 402, the route data collecting section 403 reports a relation of each flow and a link through which each flow passed, to the flow quality collecting section 402. Here, the link is a directed link that is defined based on the address of a start point and the address of an end point.

The flow quality collecting section 402 adds the quality data (a good state, a degraded state etc) received from the input output control section 401, to the data received from the route data collecting section 403, and generates the flow/link correspondence table as shown in FIG. 3A. In the example shown in FIG. 3A, the route of the flow 300 includes the links (L0 to L(N+1)), and the quality of the flow 300 is degraded.

The flow quality collecting section 402 transfers the generated flow/link correspondence table to the flow/link correspondence table managing section 406. The flow/link correspondence table managing section 406 stores the flow/link correspondence table in the storage unit such as a memory and a hard disc. Also, the flow/link correspondence table managing section 406 reports that the flow/link correspondence table has been stored and updated, to the quality degradation point estimating section 404. The quality degradation point estimating section 404 refers to the updated flow/link correspondence table and issues a setting instruction of test flows to specify a degradation link, to the flow set determining section 405. The flow set determining section 405 determines a test flow set Z for specifying the degradation link in response to the setting instruction of the test flows. The determination of the test flow set Z by the quality degradation point estimating section 404 and the flow set determining section 405 will be described below in detail.

(Determination of Test Flow Set Z)

Figure 5A:
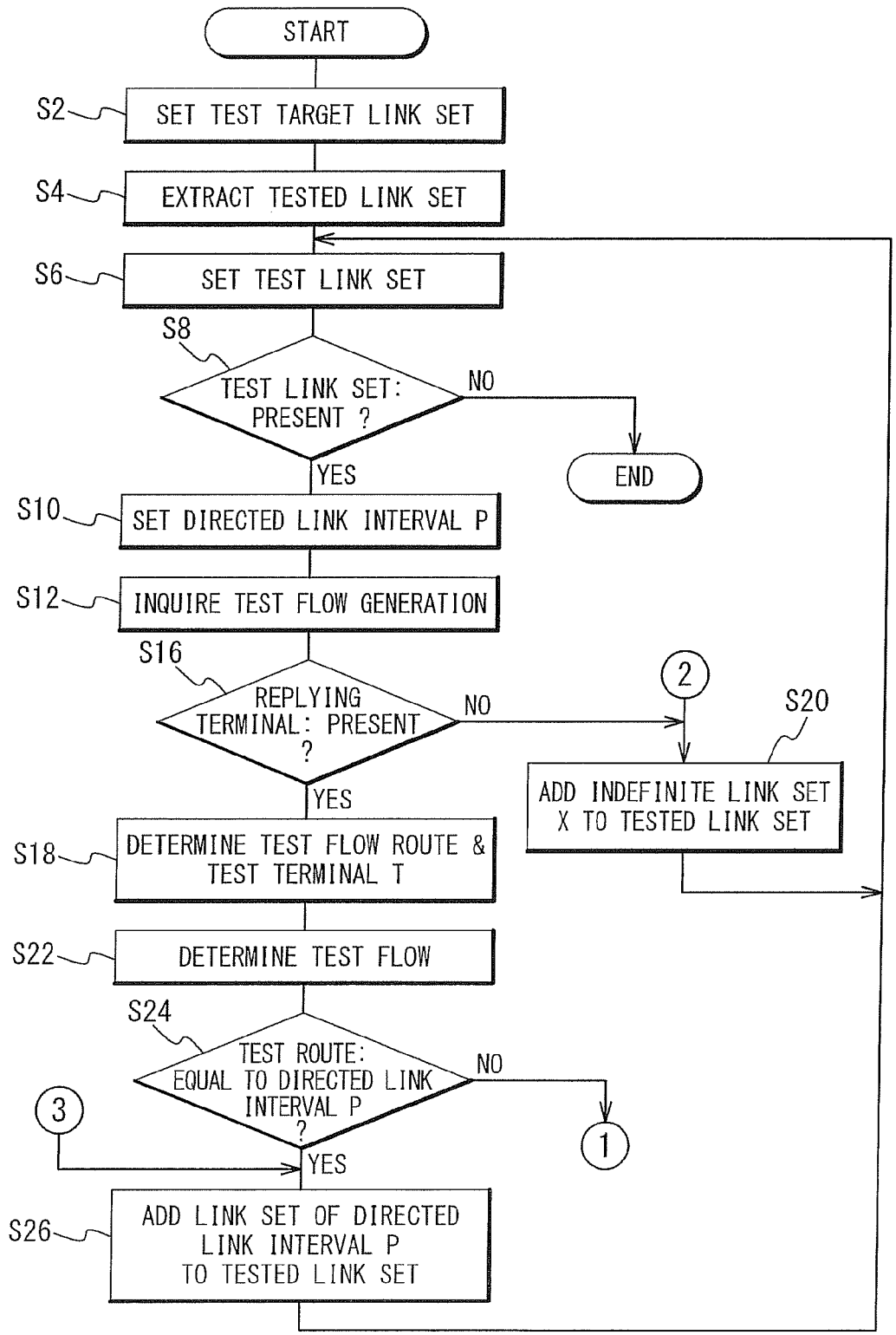
FIG. 5A is a flowchart showing a test flow set determining method according to the first exemplary embodiment.
Figure 5B:
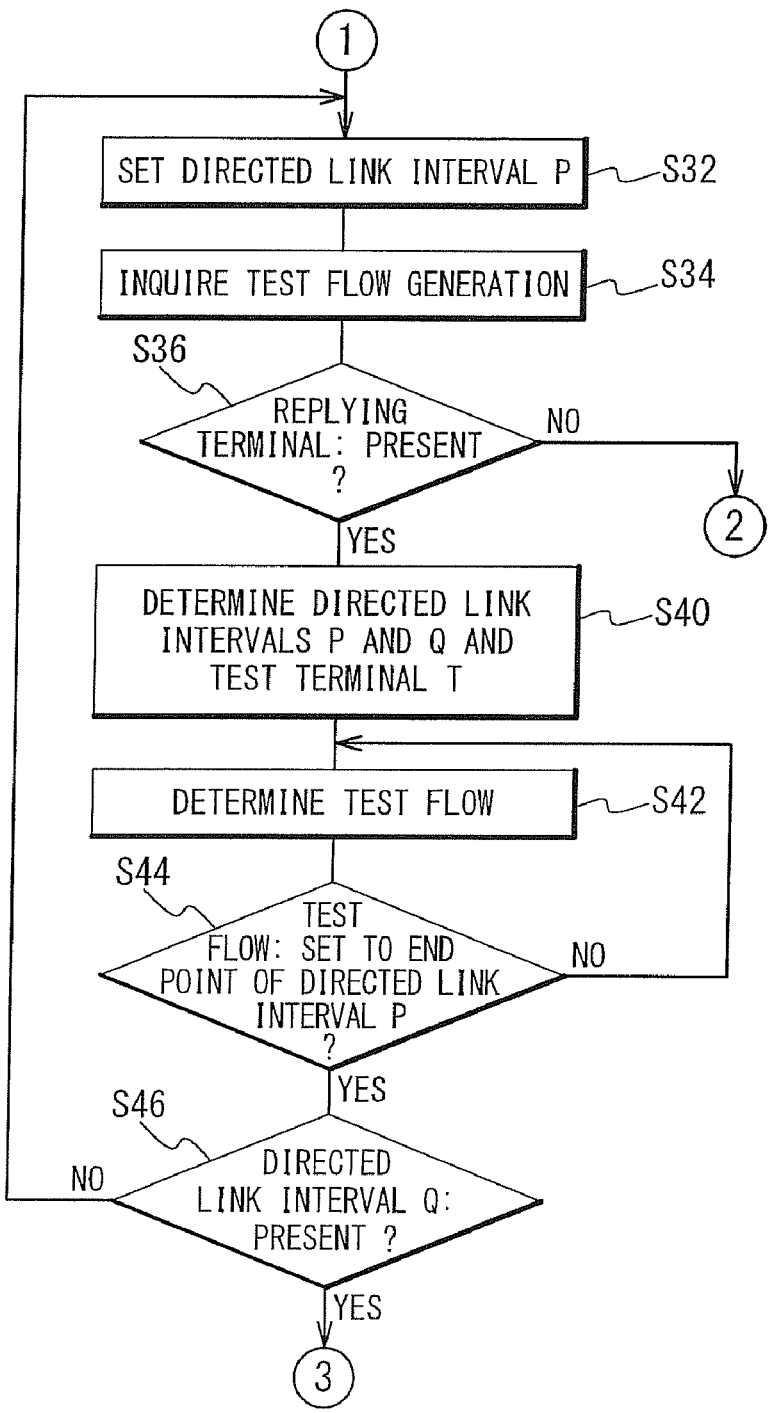
FIG. 5B is the flowchart showing the test flow set determining method according to the first exemplary embodiment.

FIG. 5A and FIG. 5B are a flowchart showing the determining method of the test flow set Z according to this exemplary embodiment. The quality degradation point estimating section 404 refers to the flow/link correspondence table and sets the link set through which the flow whose quality is degraded passes, to a "test target link Set" (Step S2). Also, the quality degradation point estimating section 404 extracts the link set through which the flow whose quality is good passes, as a "tested link set" (Step S4). For example, in case of the flow/link correspondence table shown in FIG. 3A, the links (L0 to L(N+1)) are set as the test target link set. Also, the links L1 and L(N+1) through which the flows 310 and 320 whose qualities are good pass are extracted as the tested link set.

Next, the quality degradation point estimating section 404 removes the tested link set from the flow/link correspondence table. Specifically, the quality degradation point estimating section 404 removes the tested link set from the test target link set and consequently determines a "test link set" (Step S6). For example, in case of the example as shown in FIG. 3A, the quality degradation point estimating section 404 removes the tested link set (Links L1, L(N+1)) from the test target link set (links (L0 to L(N+1)) and sets the test link set (links L1, L2 to LN). The test link set is reported to the flow/link correspondence table managing section 406. The flow/link correspondence table managing section 406 updates the flow/link correspondence table as shown in FIG. 3A to that shown in FIG. 3B. If the test link set does not exist (Step S8: No), the quality degradation point does not exist. Thus, the process is finished. If the test link set exists, (Step S8: Yes), the quality degradation point estimating section 404 issues an instruction to set the test flows to the flow set determining section 405.

In response to the setting instruction of the test flows, the concatenated directed link searching section 4053 in the flow set determining section 405 sets a "directed link interval P" (Step S10). Specifically, the concatenated directed link searching section 4053 refers to the flow/link correspondence table and sets the interval of the concatenated directed links in the test link set, as the directed link interval P. If the concatenated directed links do not exist in the test link set, the interval of a single link is set as the directed link interval P. In case of the example shown in FIG. 3B, the test link set (links L0, L2 to LN) includes the concatenated directed links (links L2 to LN), and the interval (L2 to LN) is set as the directed link interval P. The concatenated directed link searching section 4053 records the set directed link interval P (the concatenated directed links) on the concatenated directed link table 4054 and reports the setting of the directed link interval P to the route searching section 4052.

In response to the report (update) of the directed link interval P, the route searching section 4052 determines a "test flow route" through which the test flow passes and a "test Terminal T" at which the test flow can be generated (Steps S12 to S18). Specifically, in response to the report of the directed link interval P, the route searching section 4052 refers to the directed link interval P (L2 to LN) recorded on the concatenated directed link table 4054. Then, the route searching section 4052 inquires of each of the terminals 200 on the network about whether or not the new test flow can be generated in the directed link interval P (Step S12).

If there is not the terminal 200 responding to the inquiry (Step S16; No), the route searching section 4052 determines a link set included in the directed link interval P as am "indefinite link set X" and adds to the tested link set (Step S20). After that, the process proceeds to the step S6.

On the other hand, if there is the terminal 200 responding to the inquiry (Step S16; Yes), the route overlap investing section 4051 and the route searching section 4052 determine a route between each terminal 200 at which the new flow can be generated and the end point of the directed link interval P. Then, the route overlap investing section 4051 and the route searching section 4052 select the terminal 200 corresponding to a route having the longest overlap with the directed link interval P as a "test Terminal T" (Step S18). For example, in this example, it is supposed that the terminal 200-3 and the terminal 200-4 can generate the test flow and respond to the inquiry. In this case, at the step S18, the route searching section 4052 reports that the test flow can be generated from the terminals 200-3 and 200-4, to the route overlap investing section 4051. The route overlap investing section 4051 determines the route from each of the terminals 200-3 and 200-4 to the router 100-N serving as the end point of the directed link interval P (L2 to LN). FIG. 6 shows the route corresponding to each of the terminals. The route overlap investing section 4051 checks the overlap between each of the routes shown in FIG. 6 and the directed link interval P and selects the terminal 200-3 corresponding to the route having the longest overlap as the test terminal T. Then, the route overlap investing section 4051 reports the selected terminal 200-3 to the route searching section 4052.

Figure 7:
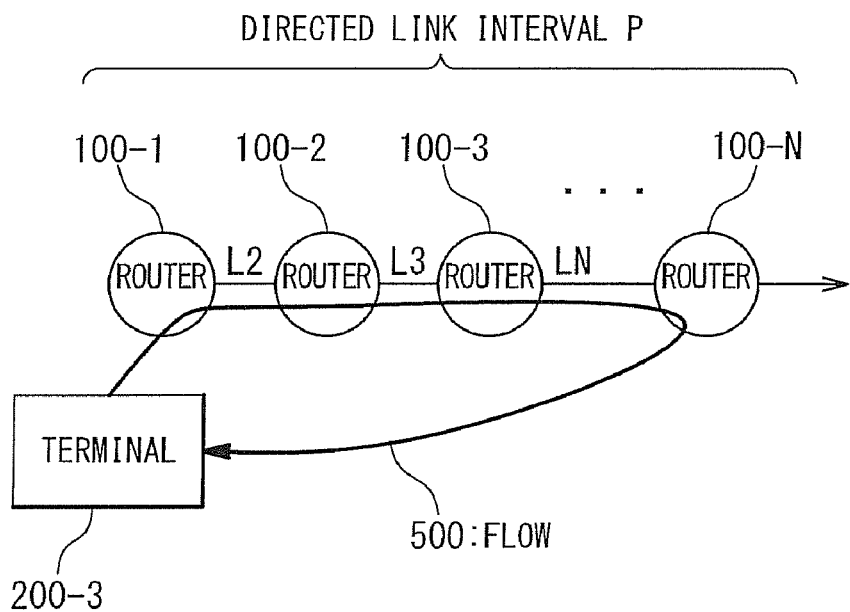
FIG. 7 is a conceptual view showing one example of a test flow according to the first exemplary embodiment.

When the test terminal T is determined at the step S18, the route searching section 4052 can determine the test flow generated at the test terminal T (Step S22). For example, the test flow is sent from the test terminal T to the end point of the directed link interval P. Then, the response destined to the test terminal T is obtained at the end point, and the response is sent to the test terminal T and received by the test terminal T. FIG. 7 shows one example of the set test flow. A test flow 500 is sent from the terminal 200-3 (the test terminal T) to the router 100-N (the end point of the directed link interval P). At the router 100-N, the response destined to the terminal 200-3 is obtained, and the response is sent to the terminal 200-3 and received by the terminal 200-3. As shown in FIG. 7, the test flow 500 shows a series of the flows. The route searching section 4052 adds this test flow 500 to the test flow set Z indicated on the flow set table 4055.

It should be noted that in order to obtain the response, it is possible to use a protocol such as ICMP (Internet Control Message Protocol) ECHO. Also, it is possible to use a response resulting from packet survival time excess. The use of the service in which the response is obtained at the router serving as the end point inverts the direction of the test flow.

As a modification example, the terminal 200 serving as the end point of the test flow can be set to a terminal different from the test terminal T. There is a possibility that measurement noise becomes greater, as the distance from the response point to the end point becomes longer. Thus, the terminal 200 serving as the end point may be set such that the distance becomes shorter. For example, the test flow is set such that the response destined to the terminal 200-4, instead of the terminal 200-3, is sent from the router 100-N. For this purpose, the designation address of the packet sent from the terminal 200-3 may be set to the router 100-N, and a transmission source address may be set to the terminal 200-4. Or, there is a possibility that the test flow passes through the larger number of different directed links, as the distance from the response point to the end point becomes longer. Thus, the terminal 200 serving as the end point may be set such that the distance becomes longer. In that case, it is possible to reduce the entire number of the test flows. Moreover, an IP source route option may be used.

Also, the following test flow is generated. A plurality of test flows are sent to each of the nodes existing in the interval in which the directed link interval P overlaps with the route from the test terminal T to the end point of the directed link interval P. The plurality of test flows are sent from the test terminal T to each of the nodes, the response is obtained at each of the nodes, and the respective responses are sent to the test terminal T. Here, the number of the hops until the intersect point at which the flow from the test terminal T overlaps on the directed link interval P is assumed to be H1. Also, the number of the hops until the end point of the directed link interval P from the test terminal T is assumed to be H2. The route searching section 4052 determines the numbers H1 and H2 and sets each of TTL (Time To Live) values of the plurality of test flows to H1 or more and H2 or less (H1·TTL·H2). It should be noted that "Designations from Test Terminal T" with regard to all the test flows are set as the end point of the directed link interval P. The route searching section 4052 adds each of the plurality of determined test flows to the test flow set Z indicated on the flow set table 4055.

Figure 8:
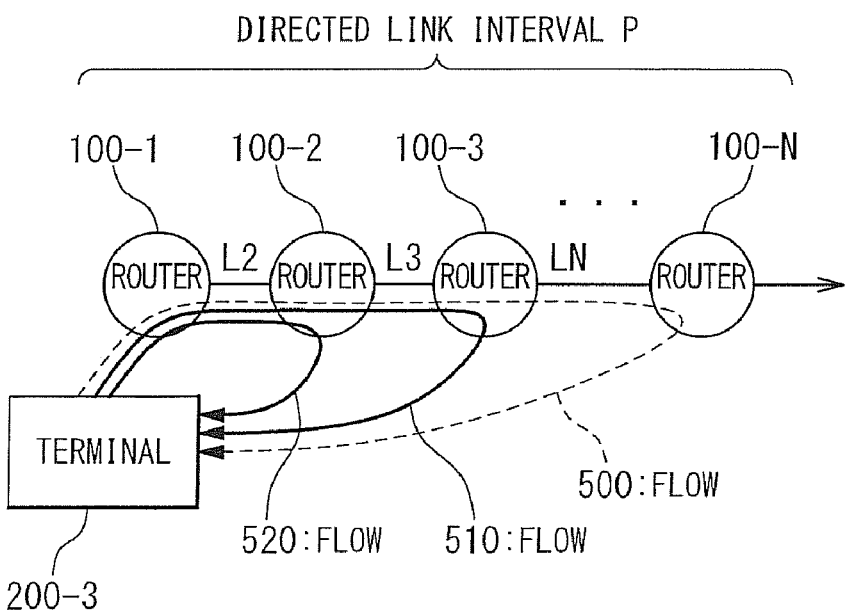
FIG. 8 is a conceptual view showing another example of a test flow according to the first exemplary embodiment.

FIG. 8 shows an example of the set test flow. The route searching section 4052 determines the hop number H1 (=1) until the intersect point at which the flow from the terminal 200-3 overlaps on the directed link interval P and the hop number H2 (=4) until the end point of the directed link interval P. Then, the route searching section 4052 determines the plurality of test flows in which the designation from the test terminal 200-3 is set as an end point L100-N, and the TTL value is set to satisfy H1·TTL·H2. For example, the nodes are changed from the start point to the end point in the directed link interval P one hop by one hop, and the test flow is set for each node. The plurality of test flows are sent from the test terminal 200-3 to the respective nodes, the responses are obtained at the respective nodes, and the respective responses are sent to the test terminal 200-3. In FIG. 8, a test flow 510 that passes through the router 100-3, and a test flow 520 that passes through the router 100-2 are set. The plurality of test flows 510 and 520 are added to the test flow set Z indicated on the flow set table 4055. In this way, the route searching section 4052 sets the test flow set Z and generates and updates the flow set table 4055 (Step S22).

Next, the route searching section 4052 reports the newly set test flow set Z and the link set corresponding to each test flow to the flow/link correspondence table managing section 406. The flow/link correspondence table managing section 406 records the data with regard to the reported test flow set Z onto the flow/link correspondence table. Thus, the flow/link correspondence table is updated. In the foregoing example, the correspondence relation between the flows 500 to 520 and the respective links is recorded on the flow/link correspondence table (refer to FIG. 10A).

If an interval in which a test route through which the set test flow set Z passes, namely, the route between the test terminal T and the end point in the directed link interval P and the directed link interval P overlap is identical to the directed link interval P (Step S24; Yes), the route searching section 4052 adds the link set included in the directed link interval P to a "tested link set" (Step S26). Thus, the tested link set is updated, and the new tested link set is set. In case of the foregoing example, the interval (L2 to LN) in which the route between the test terminal 200-3 and the end point (L100-N) and the directed link interval P overlap is identical to the directed link interval P (L2 to LN) (Step S24; Yes). Therefore, the route searching section 4052 adds the link set (L2 to LN) included in the directed link interval P to the tested link set (Step S26).

Next, the process proceeds to the step S6. At the step S6, the quality degradation point estimating section 404 removes the new tested link set from the flow/link correspondence table. Specifically, the quality degradation point estimating section 404 removes the new tested link set (L1, L(N+1), L2 to LN) from the test target link set (links L0 to L(N+1)) and sets the new test link set (link L0)]. Only the link L0 exists in the test link set updated at the step S6. Accordingly, the link L0 is set as a "new directed link interval P" (Step S8; Yes, Step S10). Also, at the steps S12 to S16, it is supposed that the responses can be obtained from the terminal 200-3 and the terminal 200-4.

At the step S18, the route overlap investing section 4051 determines the route from each of the terminal 200-3 and the terminal 200-4 to the router 100-0 serving as the end point in the directed link interval P (L0). In this case, there is no overlap between the determined route and the directed link interval P (L0). Therefore, the route overlap investing section 4051 next checks a route from the start point (the terminal 200-0) of the directed link interval P to each of the terminals 200-3 and 200-4. Then, the route overlap investing section 4051 checks the overlap between each of the routes and the directed link interval P and selects the terminal 200 corresponding to the route having the longest overlap as the test terminal T. In the foregoing example, since the overlap lengths are equal, the route overlap investing section 4051 selects one of the terminal 200-3 and the terminal 200-4 as the test terminal T. For example, the terminal 200-3 is selected as the test terminal T.

Figure 9:
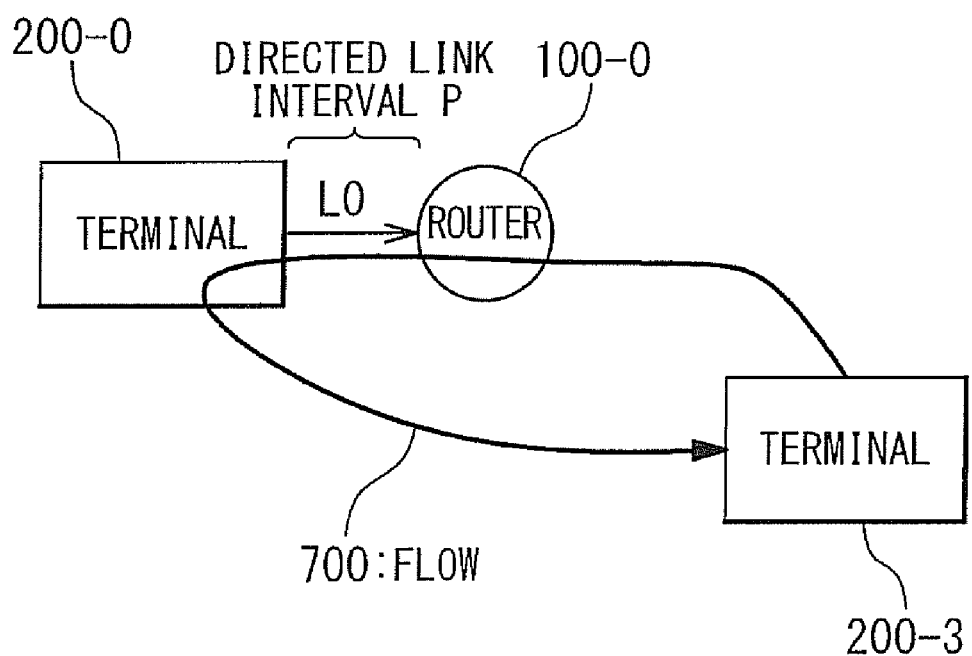
FIG. 9 is a conceptual view showing still another example of a test flow according to the first exemplary embodiment.

When the test terminal T is determined, the route searching section 4052 can determine the test flow to be generated by the test terminal T (Step S22). FIG. 9 shows one example of the set test flow. A test flow 700 is sent from the terminal 200-3 (test terminal T) to the terminal 200-0 (the start point of the directed link interval P). At the terminal 200-0, the response destined to the terminal 200-3 is obtained, and its response is sent to the terminal 200-3 and received by the terminal 200-3. The route searching section 4052 adds this test flow 700 to the test flow set Z indicated on the flow set table 4055. Next, the route searching section 4052 reports the newly set test flow 700 and the link L0 corresponding to it to the flow/link correspondence table managing section 406. The flow/link correspondence table managing section 406 updates the flow/link correspondence table. FIG. 10A shows the updated flow/link correspondence table.

The test route through which the test flow passes is only the link L0, and this is identical to the directed link interval P (L0) (Step S24; Yes). Thus, the link L0 in the directed link interval P is added to the tested link set (Step S26). The process again proceeds to the step S6.

At the step S6, the link L0 is further removed from the test target link set, and the test link set becomes an empty set. Since the test link set is the empty set (Step S8; No), the flow set determining section 405 ends the searching process for the test flow set Z.

As mentioned above, the test flow set Z, which includes the test flows 500 to 520 and the test flow 700, is recorded on the flow set table 4055. Also, as shown in FIG. 10A, the correspondence relation between the test flows 500 to 520 and 700 and the links through which they pass is recorded onto the flow/link correspondence table.

At the step S24, if the test route and the directed link interval P are not identical to each other (Step S24; No), the concatenated directed link searching section 4053 sets the directed link interval P, which does not overlap with the test route, as a new directed link interval P (Step S32). Then, the concatenated directed link searching section 4053 updates the concatenated directed link table 4054 and reports the setting of the directed link interval P to the route searching section 4052.

In response to the report of the setting (updating) of the directed link interval P, the route searching section 4052 refers to the directed link interval P recorded on the concatenated directed link table 4054. Then, the route searching section 4052 inquires of each of the terminals 200 on the network about whether or not the new test flow can be generated in the directed link interval P (Step S34).

If there is not the terminal 200 that responds to the inquiry (Step S36; No), the process proceeds to the step S20. On the other hand, if there is the terminal 200 that responds to the inquiry (Step S36; Yes), the route overlap investing section 4051 and the route searching section 4052 determine the route from the start point of the directed link interval P to each terminal 200 that can generate a new flow. Then, the route overlap investing section 4051 and the route searching section 4052 select the terminal 200 corresponding to the route, which has the longest overlap with the directed link interval P, as the test terminal T. Moreover, the concatenated directed link searching section 4053 sets the overlap route as the new directed link interval P and sets the non-overlap route as a "directed link interval Q". The concatenated directed link searching section 4053 updates the concatenated directed link table 4054 (Step S40).

When the test terminal T is determined, the route searching section 4052 can determine the test flow generated by the test terminal (Step S42). The test flow is sent from the test terminal T to the start point of the directed link interval P. At the start point, the response destined to the test terminal T is obtained, and the response is sent to the test terminal T and received by the test terminal T. The route searching section 4052 adds the test flow to the test flow set Z indicated on the flow set table 4055.

Moreover, the route searching section 4052 sets the test flow sent to a node, which is moved by one hop from the start point of the directed link interval P to the end point. The test flow is sent from the test terminal T to the node, and the response is obtained at the node. The response is sent from the node to the test terminal T and received by the test terminal T. The route searching section 4052 adds the test flow to the test flow set Z (Step S42). If the node is not the end point of the directed link interval P (Step S44; No), the step S42 is again executed (further moved by one hop). When the node serves as the end point of the directed link interval P (Step S44; Yes), the process proceeds to the step S46.

After the test flow set Z is set, if the directed link interval Q exists (Step S46; No), the process proceeds to the step S32. In that case, the concatenated directed link searching section 4053 sets the directed link interval Q as a new directed link interval P. If the directed link interval Q does not exist (Step S46; Yes), the process proceeds to the step S26.

In accordance with the foregoing procedures, the flow set determining section 405 according to this exemplary embodiment can determine the test flow set Z to specify a link that causes the quality degradation. At this time, even if the link set (L0, L2 to LN) causing the quality degradation in the flow 300 is not continuous, the test flow set Z can be determined such that the sets of the flows which passes through the respective links included in the link set are different from each other. Thus, the respective links can be independently determined.

(Generation of Test Flow)

When the searching process for the test flow set Z has been ended, the flow set determining section 405 sends a report to the flow generation instructing section 407. In response to the report, the flow generation instructing section 407 refers to the test flow set Z of the flow set table 4055 and issues an instruction to the test terminal T to generate each of the test flows.

The terminal 200 (test terminal T) receiving the flow generation instruction generates test flows in response to the instruction. Then, each test terminal T reports the quality data with regard to each test flow to the monitoring server 400. In the foregoing example, the terminal 200-3 generates the test flows 500 to 520 and 700 in response to the instruction from the flow generation instructing section 407. Then, the terminal 200-3 reports the respective quality data of the test flows 500 to 520 and 700 to the monitoring server 400.

(Specification of Degradation Link)

The flow quality collecting section 402 updates the flow/link correspondence table in accordance with the received quality data. FIG. 10B shows the updated flow/link correspondence table. The quality degradation point estimating section 404 refers to this flow/link correspondence table and estimates a link whose quality is degraded. At first, the link through which the flow having the good quality passes is removed from the candidates of the degradation links. As a result, the link L3 and the link L(N) remain as the candidates of the degradation links. If the link L(N) is assumed to be the degradation link, the reason why the quality of the flow 510 is degraded cannot be explained. On the other hand, if the link L3 is assumed to be the degradation link, the quality data with regard to all of the flows can be explained without any contradiction. Thus, the quality degradation point estimating section 404 determines the link L3 to be the degradation link.

1-3. Effect

As described above, the monitoring server 400 according to this exemplary embodiment can set the test flow set Z (test link set) for specifying the degradation link in accordance with the link set through which the flow 300 having the degraded quality passes. Since the respective test flows included in the test flow set Z are generated, the degradation link causing the quality degradation can be specified. At this time, even if the link set (L0, L2 to LN) causing the quality degradation in the flow 300 is not continuous, the test flow set Z can be determined such that the classes of the flows passing through the respective links included in the link set are different from each other. Thus, the respective links can be independently determined.

Also, when the test for specifying the link causing the quality degradation is carried out, the link set as a test target has a high possibility that the continuous directed links are included. Using the quality degradation point estimating system according to this exemplary embodiment can efficiently determine the test flow set.

According to the determining method of the test flow set Z according to this exemplary embodiment, after the search of the test flow that passes through the directed link interval P for the longest time, it is possible to set the test flow that passes through the directed link interval P for the time shorter than that test flow. For example, the test flows can be successively set by reducing the TTL value or tracing the directed link intervals P in turn. As a result, the number of times of the search for the routing table is reduced. That is, the route having the longest overlap with the concatenated directed links is firstly searched. Then, using the searched route can generate the test flow without any search for the short route. Thus, it is possible to reduce the number of the searches for the test flow set Z to specify the quality degradation point. In addition, this method has a merit that the indefinite link set X can be determined.

As a comparison example, according to the conventional technique, the test flows that pass through only one link and do not pass through the links except it are sequentially searched. When the number of the terminals that can generate the test flows is K, the usable flow is determined based on the combinations (K×(K−1)) of the terminals. Also, when the number of the links included in the link set is N, the combinations that pass through only one link and do not pass through the links except it are (N−1). Since the test flow is searched for the (N−1) combinations, the K×(K−1)×(N−1) searches are required.

On the other hand, according to this exemplary embodiment, a partial set (test link set) in the test target link set is considered. While this partial set is changed, the test flow is determined, which can reduce the number of times of the search. For example, the search for N times is executed in order to detect the concatenated directed link interval P. After that, the search is executed K times in order to detect the routes from the respective terminals 200 to the end point in the directed link interval P. Also, the search for K times is performed in order to detect the routes from the start point of the directed link interval P to the respective terminals 200. Since those searches are executed independently, the entirely (N+2K) searches are adequate. Thus, the number of the searches is reduced.

Moreover, the service in which the response is obtained in the router serving as the end point of the link is used, thereby inverting the direction of the test flow. The property that the flow does not pass through a certain link is jointly used, which greatly reduces the cost necessary for the searching process for the test flow set Z.

Second Exemplary Embodiment

The quality degradation point estimating system and the quality degradation point estimating method according to the second exemplary embodiment of the present invention will be described below. In the second exemplary embodiment, the same reference numerals and symbols are allocated to the same components as in the first exemplary embodiment, and the duplex explanations are properly omitted.

2-1. Configuration

Figure 11:
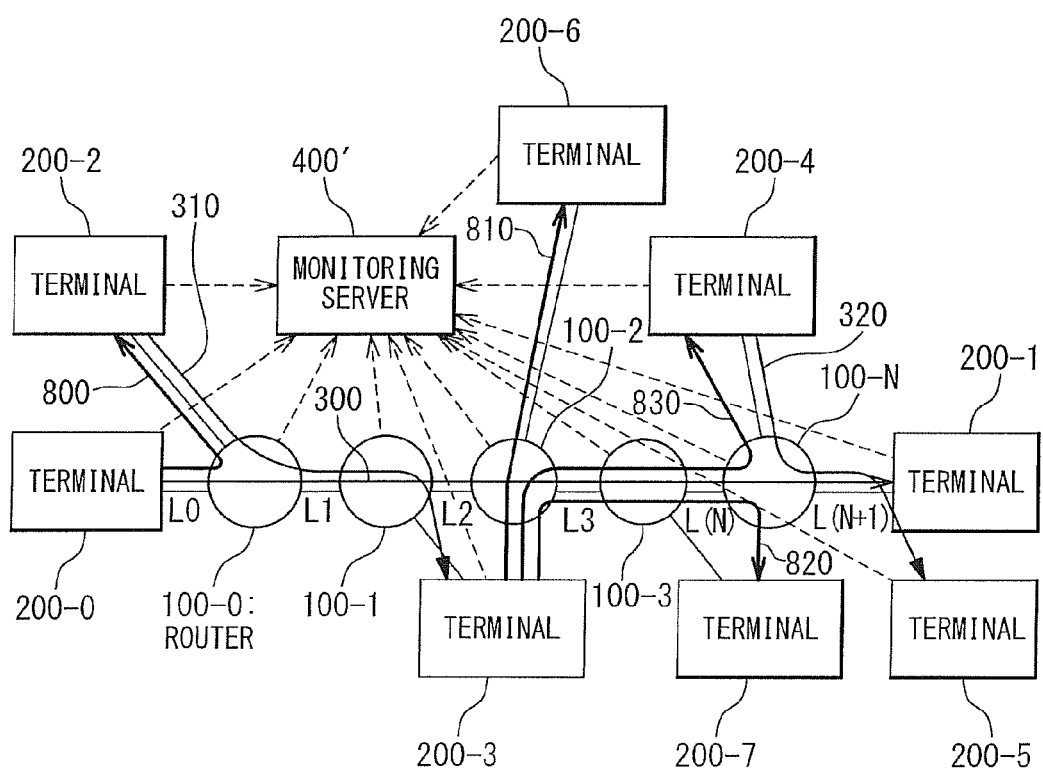
FIG. 11 is a block diagram showing a configuration of a quality degradation point estimating system according to a second exemplary embodiment of the present invention.

FIG. 11 schematically shows the configuration of the network quality measuring system (the quality degradation point estimating system) according to the second exemplary embodiment of the present invention. The network quality measuring system according to this exemplary embodiment contains a monitoring server 400' instead of the monitoring server 400 in the first exemplary embodiment. The monitoring server 400' does not have the route overlap investing section 4051, the concatenated directed link searching section 4053 and the concatenated directed link table 4054 in the first exemplary embodiment. Also, the network quality measuring system according to this exemplary embodiment further contains a terminal 200-6 and a terminal 200-7. It should be noted that this exemplary embodiment is assumed that the flow 300, the flow 310 and the flow 320, which are identical to the first exemplary embodiment, are generated.

2-2. Detailed Process (Generation of Flow/Link Correspondence Table)

Similarly to the first exemplary embodiment, the route searching section 4052 in the monitoring server 400' adds the quality data (the good state, the degraded state, etc.) received from the input output control section 401, to the data received from the route data collecting section 403, and generates the flow/link correspondence table as shown in FIG. 3A.

The flow quality collecting section 402 transfers the generated flow/link correspondence table to the flow/link correspondence table managing section 406. The flow/link correspondence table managing section 406 stores the flow/link correspondence table in the storage unit such as the memory and the hard disc. Also, the flow/link correspondence table managing section 406 updates the flow/link correspondence table stored in the storage unit. Then, the flow/link correspondence table managing section 406 reports that the flow/link correspondence table is stored and updated, to the quality degradation point estimating section 404.

The quality degradation point estimating section 404 refers to the updated flow/link correspondence table and issues the setting instruction of the test flow to specify the degradation link, to the flow set determining section 405. The flow set determining section 405 determines the test flow set Z to specify the degradation link in response to the setting instruction of the test flow.

(Determination of Test Flow Set Z)

Figure 12:
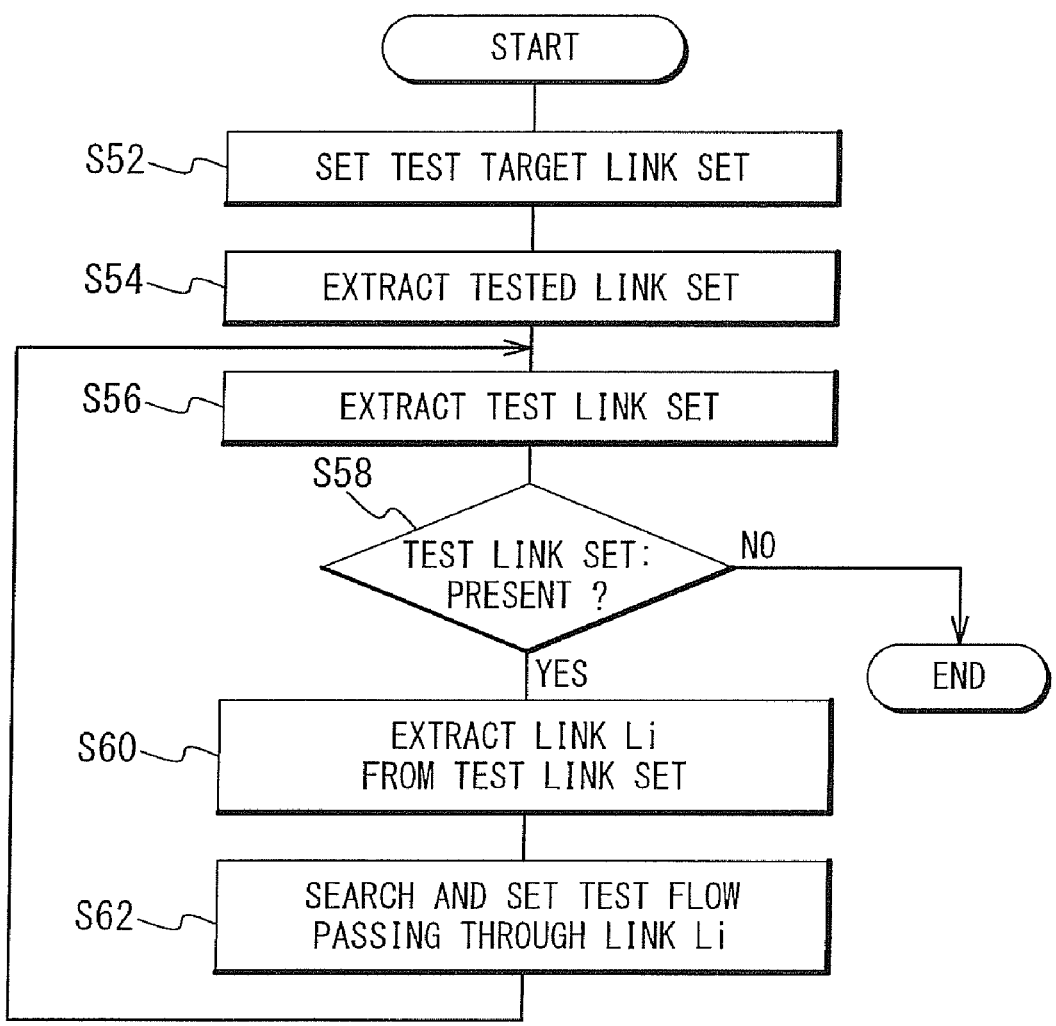
FIG. 12 is a flowchart showing a test flow set determining method according to the second exemplary embodiment.

FIG. 12 is a flowchart showing the determining method of the test flow set Z according to this exemplary embodiment.

The quality degradation point estimating section 404 refers to the flow/link correspondence table and sets the link set, through which the flow having the degraded quality passes, to a "test target Link set" (Step S52). Also, the quality degradation point estimating section 404 extracts the link set through which the flow having the good quality passes as the "tested link set" (Step S54). For example, in case of the flow/link correspondence table shown in FIG. 3A, the links L0 to L(N+1) are set as the test target link set. Also, the links L1 and L(N+1) through which the flows 310 and 320 having the good qualities are extracted as the tested link set.

Next, the quality degradation point estimating section 404 removes the tested link set from the flow/link correspondence table. Specifically, the quality degradation point estimating section 404 removes the tested link set from the test target link set and consequently determines the test link set (Step S56). For example, in case of the example shown in FIG. 3A, the quality degradation point estimating section 404 removes the tested link set (the links L1, L(N+1)) from the test target link set (the links L0 to L(N+1)) and sets the test link set (the links L0, L2 to LN). The test link set is reported to the flow/link correspondence table managing section 406. The flow/link correspondence table managing section 406 updates the flow/link correspondence table shown in FIG. 3A to that shown in FIG. 3B.

If the test link set does not exist (Step S58; No), the quality degradation point does not exist. Thus, the process is ended. If the test link set exists (Step S58; Yes), the quality degradation point estimating section 404 issues the instruction for setting the test flow to the flow set determining section 405. In response to the setting instruction of the test flow, the route searching section 4052 in the flow set determining section 405 extracts one link from the test link set and sets the extracted link as the "targeted link Li" (Step S60). When it is extracted, the targeted link Li is removed from the test link set and added to the tested link set. At this time, the link included in the test link set is referred to as a "non-targeted link".

Next, the route searching section 4052 searches a combination of the terminals 200 (the sending side terminal and the receiving side terminal) that can send a test flow which passes through the targeted link Li and does not pass through the non-targeted link. The combination of the terminals 200 from which the response is obtained serves as the test terminals. The route searching section 4052 sets a flow between the test terminals as the test flow, and adds the test flow to the test flow set Z indicated on the flow set table 4055 (Step S62).

After that, the process proceeds to the step S56. Then, until the test link set becomes the empty set, the steps S56 to S62 are repeated. In accordance with the foregoing procedures, the flow set determining section 405 can determine the test flow set Z to specify the degradation link at the high probability. For example, with reference to FIG. 13A, the route searching section 4052 extracts the link L0 as the targeted link Li from the test link set (L0, L2 to N). When it is extracted, the targeted link L0 is removed from the test link set and added to the tested link set. Next, the route searching section 4052 searches a test flow 1 which passes through the targeted link L0 and does not pass through the non-targeted links (L2 to LN). Here, the combination of a transmission terminal and a reception terminal is searched, and a flow 800 in which the terminal 200-0 serves as the transmission terminal and the terminal 200-2 serves as the reception terminal is detected (refer to FIG. 11). Then, as shown in FIG. 13B, the flow 800 is recorded as the test flow 1 on the flow set table 4055.

Next, the route searching section 4052 extracts a link L2 as the targeted link Li from the test link set (L2 to LN). When it is extracted, the targeted link L2 is removed from the test link set and added to the tested link set. Next, the route searching section 4052 searches a test flow 2 which passes through the targeted link L2 and does not pass through the non-targeted links (L3 to LN). Here, the already-targeted link L0 is set at "Don't Care (May Pass or May Not Pass)" (indicated by * in FIG. 13A). The combination of the transmission terminal and the reception terminal is searched, and a flow 810 in which the terminal 200-0 or terminal 200-3 serves as the transmission terminal, and the terminal 200-6 serves as the reception terminal is detected (refer to FIG. 11). As shown in FIG. 13B, the flow 810 (the transmission terminal 200-3 and the reception terminal 200-6) is recorded as the test flow 2 on the flow set table 4055.

Next, the route searching section 4052 extracts the link L3 as the targeted link Li from the test link set (L3 to LN). When it is extracted, the targeted link L3 is removed from the test link set and added to the tested link set. Next, the route searching section 4052 searches a test flow 3 which passes through the targeted link L3 and does not pass through the non-targeted link (LN). Here, the already-targeted links L0 and L2 are set to "Don't Care". The combination of the transmission terminal and the reception terminal is searched, and a flow 820 in which the terminal 200-0 or terminal 200-3 is serves as the transmission terminal, and the terminal 200-7 serves as the reception terminal is detected (refer to FIG. 11). As shown in FIG. 13B, the flow 810 (the transmission terminal 200-3 and the reception terminal 200-7) is recorded as the test flow 3 on the flow set table 4055.

Finally, the route searching section 4052 extracts the link LN from the test link set (LN). When it is extracted, the targeted link LN is removed from the test link set and added to the already-targeted link set. Next, the route searching section 4052 searches a test flow 4 which passes through the targeted link LN and does not pass through the non-targeted link. Here, the already-targeted links L0, L2 and L3 are set to "Don't Care". As shown in FIG. 11 and FIG. 13B, a flow 830 (the transmission terminal 200-3 and the reception terminal 200-4) is recorded as the test flow 4 on the flow set table 4055. (Generation of Test Flow, Specification of Degradation Link)

When the searching process for the test flow set Z has been ended, the flow set determining section 405 reports to the flow generation instructing section 407. In response to the report, the flow generation instructing section 407 refers to the test flow set Z of the flow set table 4055 and issues an instruction to the respective test terminals T to generate the respective test flows. Hereinafter, the specifying process for the degradation link is similar to the first exemplary embodiment, and its explanation is omitted.

2-3. Effect

As explained above, according to the second exemplary embodiment, among the degraded link sets (the test targeted link sets), the respective links in the test link set are targeted in turn. Then, the already-targeted link, which passes through the targeted link and does not pass through the non-targeted link, is "Don't Care", and the flow is searched. Differently from the conventional technique, a flow which passes through only the targeted link and does not pass through the other links is not always targeted. Thus, the search range becomes wide. Therefore, the test flow set Z in which the quality degradation point can be specified can be determined at the higher probability.

The invention claimed is:

1. A quality degradation point estimating method of estimating a quality degradation point in a directed link set through which a communication flow has passed on a network, comprising:
 (A) determining a test flow set for estimating the quality degradation point; and
 (B) estimating the quality degradation point in a directed link set by sending the test flow set to said network,
 wherein said (A) determining comprises:
 setting a flow, which passes through a partial set as a part of the directed link set, as a test flow; and
 adding the set test flow to the test flow set, and
 the test flow is sent from a test terminal on said network to a predetermined node in the partial set, a response is obtained at said predetermined node, and the response is sent from said predetermined node to a predetermined terminal,
 wherein the predetermined node is a terminal on said network other than said test terminal and other than said predetermined terminal,
 wherein said predetermined terminal receiving the response is said test terminal,
 wherein said (A) determining comprises:
 (a) setting continuous directed links included in the directed link set as the partial set, and setting an interval of the continuous directed links as a directed link interval;
 (b) setting the flow, which passes through at least a part of the directed link interval, as the test flow;
 (c) adding the set test flow to the test flow set;
 (d1) determining a route from each of terminals which can generate the flow in the directed link interval, to said end point of the directed link interval;
 (d2) setting one of said terminals corresponding to the route having the longest overlap with the directed link interval, of the determined routes, as said test terminal;
 (e1) setting the link set included in the directed link interval as an indefinite link set, if said test terminal is not found out; and
 (e2) updating the directed link set by removing the indefinite link set from the directed link set, and
 wherein the test flow is sent from said test terminal to said predetermined node in the directed link interval, the response is obtained at said predetermined node, and the response is sent from said predetermined node to said predetermined terminal.

2. The quality degradation point estimating method according to claim 1, wherein the test flow set includes a first test flow as the test flow, and
 the first test flow is sent from said test terminal to an end point of the directed link interval, the response is obtained at said end point, and the response is sent from said end point to said predetermined terminal.

3. The quality degradation point estimating method according to claim 1, wherein the response is an ECHO response resulting from ICMP (Internet Control Message Protocol).

4. The quality degradation point estimating method according to claim 1, wherein the response is a response resulting from a packet survival time excess.

5. A quality degradation point estimating method of estimating a quality degradation point in a directed link set through which a communication flow has passed on a network, comprising:
 (A) determining a test flow set for estimating the quality degradation point; and
 (B) estimating the quality degradation point in a directed link set by sending the test flow set to said network,
 wherein said (A) determining comprises:
 setting a flow, which passes through a partial set as a part of the directed link set, as a test flow; and
 adding the set test flow to the test flow set, and
 the test flow is sent from a test terminal on said network to a predetermined node in the partial set, a response is obtained at said predetermined node, and the response is sent from said predetermined node to a predetermined terminal,
 wherein the predetermined node is a terminal on said network other than said test terminal and other than said predetermined terminal,
 wherein said (A) determining comprises:
 (a) setting continuous directed links included in the directed link set as the partial set, and setting an interval of the continuous directed links as a directed link interval;
 (b) setting the flow, which passes through at least a part of the directed link interval, as the test flow; and
 (c) adding the set test flow to the test flow set, and
 the test flow is sent from said test terminal to said predetermined node in the directed link interval, the response is obtained at said predetermined node, and the response is sent from said predetermined node to said predetermined terminal,
 wherein the test flow set includes a plurality of third test flows as the test flows,
 a number of hops until an intersection point at which the flow from said test terminal overlaps on the directed link interval is H1, and a number of hops until an end point of the directed link interval from said test terminal is H2, each of TTL (Time To Live) values in the plurality of third test flows is set to H1 or more and H2 or less, and a destination of each of said plurality of third test flows is set as said end point of the directed link interval, and each of the plurality of third test flows is sent from said test terminal to a plurality of nodes in the directed link interval, the response is obtained at each of the plurality of nodes, and the response is sent from each node to said predetermined terminal.

6. The quality degradation point estimating method according to claim 5, wherein said (b) setting comprises:
 (b1) setting a start point of the directed link interval as said predetermined node;
 (b2) setting the flow sent to said predetermined node as one of the plurality of third test flows; and
 (b3) repeatedly performing said (b2) setting while changing said predetermined node from said start point of the directed link interval to said end point one hop by one hop.

7. A method for estimates a quality degradation point in a directed link set through which a communication flow has passed on a network, comprising:
 determining a test flow set for estimating the quality degradation point;
 sending the test flow set to said network and estimating the quality degradation point in a directed link set,
 wherein said determining comprises:
 setting a flow, which passes through a partial set as a part of the directed link set, as the test flow; and
 adding the set test flow to the test flow set, and
 the test flow is sent from a test terminal on said network to a predetermined node in the partial set, a response is obtained at said predetermined node, and the response is sent from said predetermined node to a predetermined terminal,
 wherein said determining further comprises:
 setting continuous directed links included in the directed link set as the partial set, and setting an interval of the continuous directed links as a directed link interval, and for setting a flow, which passes through at least a part of the directed link interval, as the test flow; and
 adding the set test flow to the test flow set, and
 the test flow is sent from said test terminal to said predetermined node in the directed link interval, the response is obtained at said predetermined node, and the response is sent from said predetermined node to said predetermined terminal,
 wherein said determining further comprises:
 determining a route from each of terminals which can generate the flow in the directed link interval, to said end point of the directed link interval; and
 setting one of said terminals corresponding to the route having the longest overlap with the directed link interval, of the determined routes, as said test terminal,
 wherein said determining further comprises:
 setting the link set included in the directed link interval as an indefinite link set, if said test terminal is not found out; and
 updating the directed link set by removing the indefinite link set from the directed link set,
 wherein the predetermined node is a terminal on said network other than said test terminal and other than said predetermined terminal.

* * * * *